United States Patent
Winn et al.

(10) Patent No.: US 7,729,531 B2
(45) Date of Patent: Jun. 1, 2010

(54) IDENTIFYING REPEATED-STRUCTURE ELEMENTS IN IMAGES

(75) Inventors: John Winn, Cambridge (GB); Anitha Kannan, Cambridge (GB); Carsten Rother, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/533,297

(22) Filed: Sep. 19, 2006

(65) Prior Publication Data
US 2008/0069438 A1 Mar. 20, 2008

(51) Int. Cl.
G06K 9/62 (2006.01)
(52) U.S. Cl. ...................................... 382/155
(58) Field of Classification Search .................. None
See application file for complete search history.

(56) References Cited

OTHER PUBLICATIONS

Eran Borenstein, "Shape Guided Object Segmentation," 2006, IEEE.*
Borenstein, E. et al., "Class-specific, top-down segmentation", In Proceedings of European Conference on Computer Vision, 2003, 14 pages.
Borenstein, E. et al., "Combining top-down and bottom-up segmentation", In Proceedings IEEE workshop on Perceptual Organization in Computer Vision, CVPR 2004, 8 pages.
Boykov, Y. et al., "Fast approximate energy minimization via graph cuts", PAMI, 23(11), 2001, 8 pages.
Efros, A. et al., "Image quilting for texture synthesis and transfer", vol. 20, 2001, 6 pages.
Fergus, R. et al. "Object class recognition by unsupervised scale-invariant learning", In Proceedings of the IEEE Conference on Computer Vision and Pattern Recognition, vol. 2, pp. 264-271, Jun. 2003.
Freeman, W. et al. "Learning low-level vision", Int. J. Computer Vision, 40(1), 2000, pp. 25-47.
Huttenlocher, Crandall, et al., "Spatial priors for part-based recognition using statistical models", In Proceedings of IEEE CVPR, 2005, 8 pages.
Jojic N., et al. "Epitomic analysis of appearance and shape", in Proceedings of IEEE ICCV, 2003, 10 pages.
Leibe, B. et al., "Interleaved object categorization and segmentation", In Proceedings of British Machine Vision Conference, 2003, 10 pages.
Roth, S. et al. "Fields of experts: A framework for learning image priors", In Proceedings of IEEE CVPR, 2005, 8 pages.

(Continued)

Primary Examiner—Vu Le
Assistant Examiner—Alex Liew
(74) Attorney, Agent, or Firm—Lee & Hayes, PLLC

(57) ABSTRACT

Many problems in the fields of image processing and computer vision relate to creating good representations of information in images of objects in scenes. We provide a system for learning repeated-structure elements from one or more input images. The repeated-structure elements are patches that may be single pixels or coherent groups of pixels of varying shape, size and appearance (where those shapes and sizes are not pre-specified). Input images are mapped to a single output image using offset maps to specify the mapping. A joint probability distribution on the offset maps, output image and input images is specified and an unsupervised learning process is used to learn the offset maps and output image. The learnt output image comprises repeated-structure elements. This shape and appearance information captured in the learnt repeated-structure elements may be used for object recognition and many other tasks.

18 Claims, 15 Drawing Sheets

OTHER PUBLICATIONS

Turk, Matthew "Eigenfaces and Beyond", Academic Press 2005, pp. 1-29.

Zisserman, A. et al., "Image-based rendering using image-based priors", In Proceedings of IEEE ICCV, 2003, 8 pages.

* cited by examiner

FIG. 5a
FIG. 5b
FIG. 5c
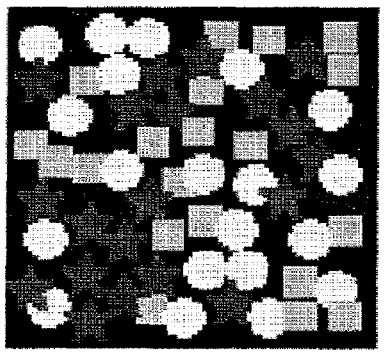
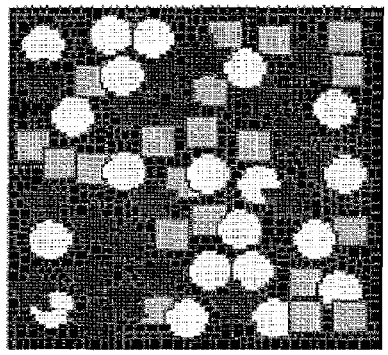
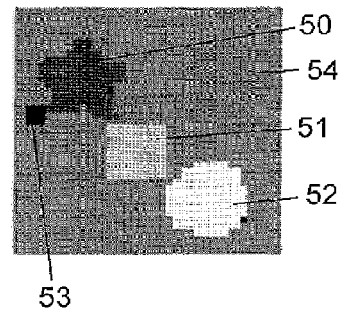

IDENTIFYING REPEATED-STRUCTURE ELEMENTS IN IMAGES

TECHNICAL FIELD

This description relates generally to image processing and computer vision. It is particularly related to, but in no way limited to, identifying repeated structure elements in images using a probabilistic model in an unsupervised learning process.

BACKGROUND

Many problems in the fields of image processing and computer vision relate to creating good representations of information in images of objects in scenes. A great variety of computer vision tasks, for example, that involve image understanding, image synthesis, or image compression, rely on improved representations of structure in images. It is required to improve such computer vision tasks not only in terms of improved functional ability but also in improved processing times, robustness and ability to learn the representations or models automatically.

For example, one problem is that there is immense variability of object appearance due to factors confounded in image data such as illumination, viewpoint etc. Shape and reflectance are intrinsic properties of an object but an image of an object is a function of several other factors. Some previous approaches to computer vision tasks have attempted to infer from images information about objects that is relatively invariant to these sources of image variation. For example, template based representations or feature based representations have been used to extract information from images such that intensity values of the original image are completely removed from the final representation. Other previous approaches to computer vision tasks have instead used appearance-based representations. For example, stored images of objects rather than 3D shape models. An example of an appearance-based approach is to use correlation to attempt to match image data to previously stored images of objects to carry out object recognition.

The range of choices for appearance-based models vary from histogram-based representation that throws away spatial information, to complete template-based representation that tries to capture the entire spatial layout of the objects. In the middle of this spectrum lies patch-based models that aim to find the right balance between the two extremes. These models aim to find representations that can be used to describe patches of pixels in images that contain repeated structure. However, patch sizes and shapes have previously been hand-selected, for example, as being rectangles of a given size. This is disadvantageous because it is not simple to select an appropriate patch size and shape. In addition, performance of such patch-based models is required to be improved.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Many problems in the fields of image processing and computer vision relate to creating good representations of information in images of objects in scenes. We provide a system for learning repeated-structure elements from one or more input images. The repeated structure elements are patches that may be single pixels, features of other image elements or coherent groups of pixels, features or other image elements of varying shape, size and appearance (where those shapes and sizes are not pre-specified). Input images are mapped to a single output image using offset maps to specify the mapping. A joint probability distribution on the offset maps, output image and input images is specified and an unsupervised learning process is used to learn the offset maps and output image. The learnt output image comprises repeated-structure elements. This shape and appearance information captured in the learnt repeated-structure elements may be used for object recognition and many other tasks Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 5a is an example of an input image;

FIG. 5b is an example of the input image of FIG. 5a segmented into learnt repeated-structure elements;

FIG. 5c is an example of learnt repeated-structure elements from the input image of FIG. 5a;

Like reference numerals are used to designate like parts in the accompanying drawings.

DETAILED DESCRIPTION

Figure 1:
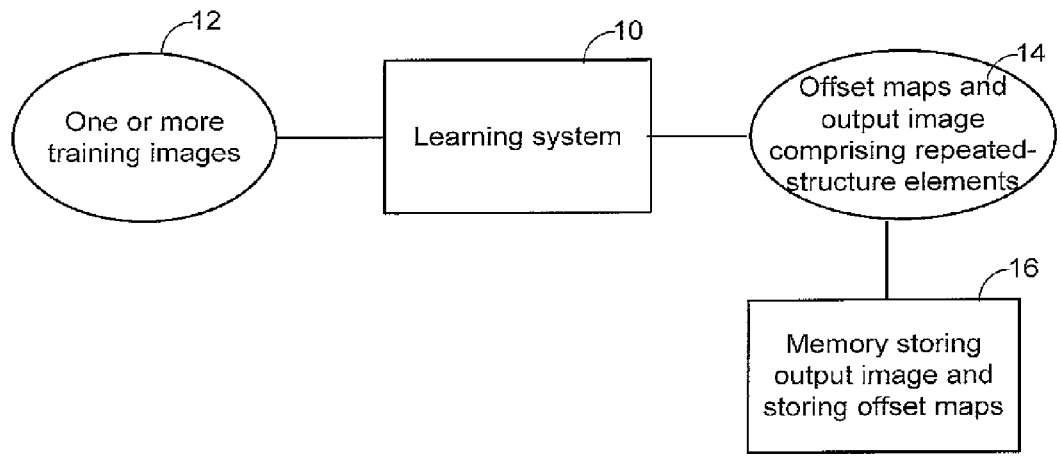
FIG. 1 is a schematic diagram of a learning system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image processing system, the system described is provided as an example and not a limitation. As those skilled in the art will appreciate, the present examples are suitable for application in a variety of different types of computer vision systems, image compression systems, image analysis systems and the like.

The term "appearance" is used herein to refer to color or gray level intensity values of image elements such as pixels or groups of pixels or any function or feature of these values computed at regular locations across the image.

The term "image element" is used herein to refer to a pixel, group of pixels, or localized feature of an image.

As mentioned above, patch-based models aim to find representations that can be used to describe patches of pixels in images. However, patch sizes and shapes have previously been hand-selected, for example, as being rectangles of a given size. For example, the epitome model of jojic et al. "Epitomic analysis of appearance and shape" in Proceedings of IEEE ICCV, 2003 is a generative model for image patches. Epitomes are learned using a set of fixed shaped patches (manually specified as being rectangles) from an input image over a small range of manually pre-specified sizes. We provide an improved patch-based model where at least the patch sizes and shapes are automatically determined so as to represent best the structures present in the image.

As mentioned above, patch-based model have previously been used to try to represent repeated structure in images of objects. Patch sizes and shapes have previously been hand-selected, for example, as being rectangles of a given size. This is disadvantageous because it is not simple to select an appropriate patch size and shape. In addition, we recognize that using rectangular patch shapes is a poor assumption given that different object parts (or other recurring image structures) have different sizes and shapes. We recognize that the use of fixed patches reduces accuracy when an object part is of a different shape to the patch since that patch model then has to cope with variability outside the part. We note that this effect is particularly evident when the object part is at the edge of an object as the model then has to try and capture variability of the background. Also, accuracy is reduced if the patch selected is smaller than the object part, since the entire part is not represented. We also note that patch-based models have previously ignored the shape of object parts which can be much more discriminative than appearance alone.

Another problem in the field of computer vision concerns the choice of scale at which to analyze images. For example, if images of whole scenes were to be learnt for the purposes of object recognition, it would be necessary to store huge numbers of images. If single pixel values are learnt then it is easier to store all the possible values but difficult to recognize objects using only pixels. To address this problem we provide a means to discover a size a which an image region will look similar in many images whilst still providing the ability to discriminate between different objects.

We provide a system for learning repeated-structure elements from one or more input images. The repeated-structure elements are patches that may be single pixels or coherent groups of pixels of varying shape and sizes (where those shapes and sizes are not pre-specified). Once learnt, these patches comprise structure, which may be texture, object parts or objects for example, which is repeated in a single image or between a plurality of images. FIG. 1 is a high level diagram of the learning system 10 which takes as input one or more images 12 of objects in scenes. The learning system 10 comprises an unsupervised learning system that is data-driven. The system produces an image 14 comprising a plurality of learnt repeated-structure elements. The term "output image comprising learnt repeated-structure elements" will be used herein to refer to those learnt repeated structure elements. Each learnt repeated-structure element comprises a patch which is typically a coherent group of pixels of any particular size and shape and may also be a single pixel. The learning system 10 also outputs an offset map for each input image as explained in more detail below. The learnt output image comprising the learnt repeated structure elements may be stored in a memory 16 of any suitable type. The offset map(s) may also be stored in the memory. The output image and offset map(s) provide a useful model of the input image (s). For example, the input images may be reconstructed from the learnt repeated-structure elements in the output image and the offset maps.

The learning system 10 is provided using a computer or any suitable type of processor. Platform or other operating system or supporting software is provided on the computer such that software implementing the learning system 10 may be executed. The learning system 10 has an input arranged to receive the one or more training images. The input is of any suitable type such as an internet connection, a disc drive, a USB connection or any other suitable input. The input may also be an image acquisition device such as a camera, video camera, medical imaging apparatus, scanner, or other apparatus suitable for obtaining an image and connected to the learning system 10. The memory 16 may be integral with the learning system 10 or may be independent and in communication with the learning system.

Figure 2:
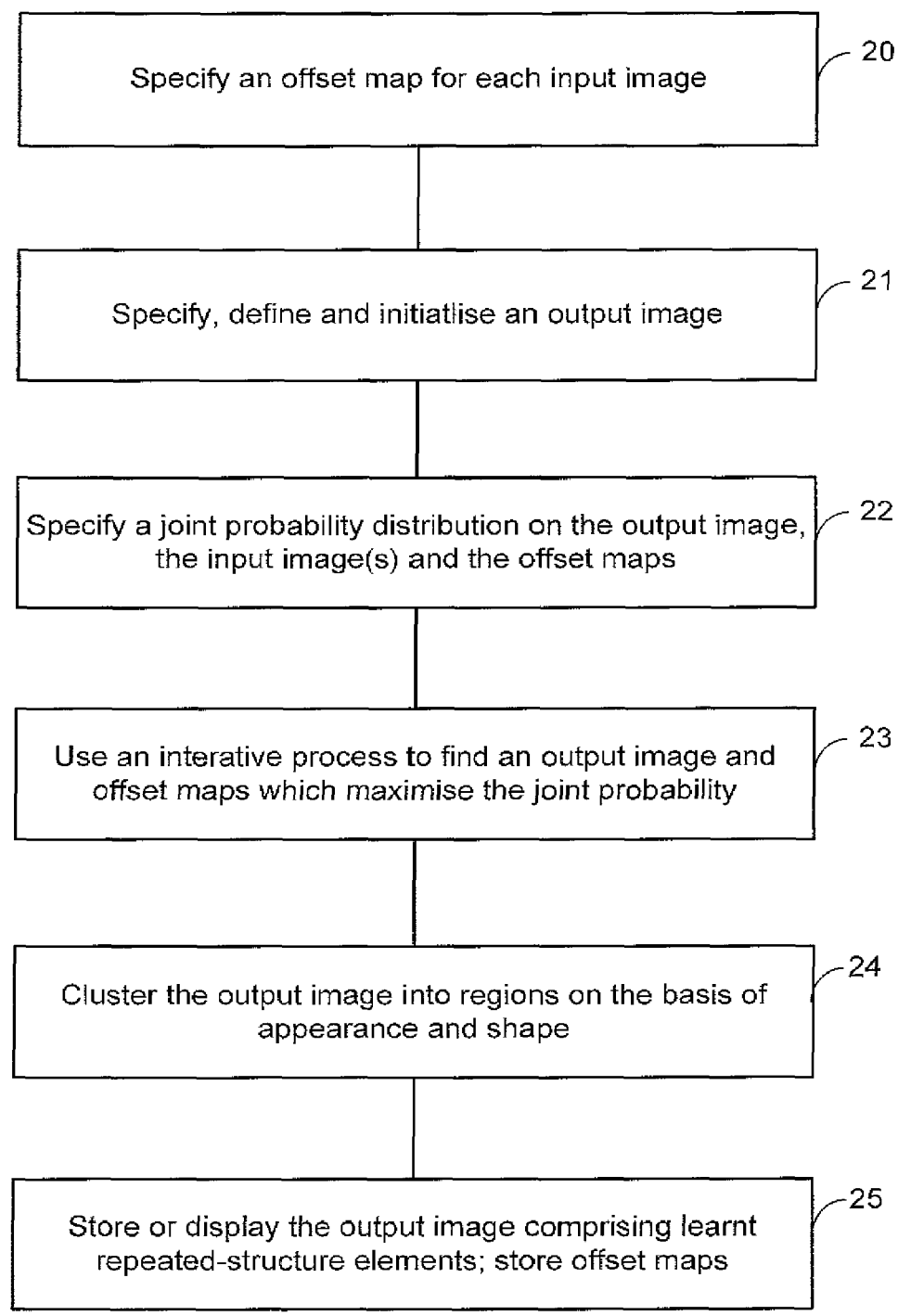
FIG. 2 is a flow diagram of a method of learning repeated-structure elements.

FIG. 2 is a flow diagram of a method of learning a plurality of repeated-structure elements from one or more input images. An offset map is specified 20 for each input image and a single output image is specified and initialized 21. The output image corresponds to the image 14 of FIG. 1 comprising the learnt repeated-structure elements but at this stage that output image is randomly initialized or initialized in some other appropriate manner. The offset maps are described in detail below and these comprise details of how to map pixels from the associated input image onto the output image.

A joint probability distribution is then specified on the output image, the input image(s) and the offset map(s) (see box 22). The joint probability distribution is specified in detail below. It incorporates one or more criteria including that each of the input images can be approximately reconstructed using only repeated-structure elements from the output image. In addition, each repeated-structure element should be similar in appearance and shape to as many regions of the input image (s) as possible. However, there is no minimum number, a repeated-structure element may be similar to only one region in the input images.

Terms are incorporated to encourage neighboring pixels in the input images to have the same or similar offsets (so that patches found in the output image are not all single pixels and comprise coherent groups of several pixels). These terms are also referred to as neighborhood constraints. For example, this is achieved by defining a Markov random field on the offset maps as described in more detail below. It is not essential to use a Markov random field, any embedding method that preserves local neighborhood structure may be used for the neighborhood constraints. By favoring neighboring offsets that are similar (in addition to favoring identical offsets) we allow patches to deform. This is also referred to a relaxing the neighborhood constraints. In this way learnt repeated-structure elements may optionally be made invariant to local deformations, scaling and small rotations of regions in the input images.

An optimization process 23 is then used to find an output image and offset maps which maximize (or substantially maximize for workable purposes) the joint probability. Thus an unsupervised learning process is provided which is data-driven. It is acceptable to find local maxima or approximate solutions to the joint probability. In some examples the optimization process comprises an expectation maximization process. For example, this comprises an iterative process which provides a computationally realistic, fast and robust method of determining the output image. An example iterative process is described in more detail below with reference to FIG. 4.

Given the output image, the set of regions in the output image corresponding to segmented regions of the input image are clustered 24 according to the degree of overlap, leading to a clustering based on both appearance and shape. This clustering process may be integral with the process of finding the output image which maximizes the joint probability distribution (i.e. the learning process). Alternatively, this clustering process may be separate. Each cluster is a learnt repeated-structure element. Each cluster explains a plurality of regions in the input image(s). The clusters may overlap in the output image. The output image may be stored or displayed 25.

Figure 3:
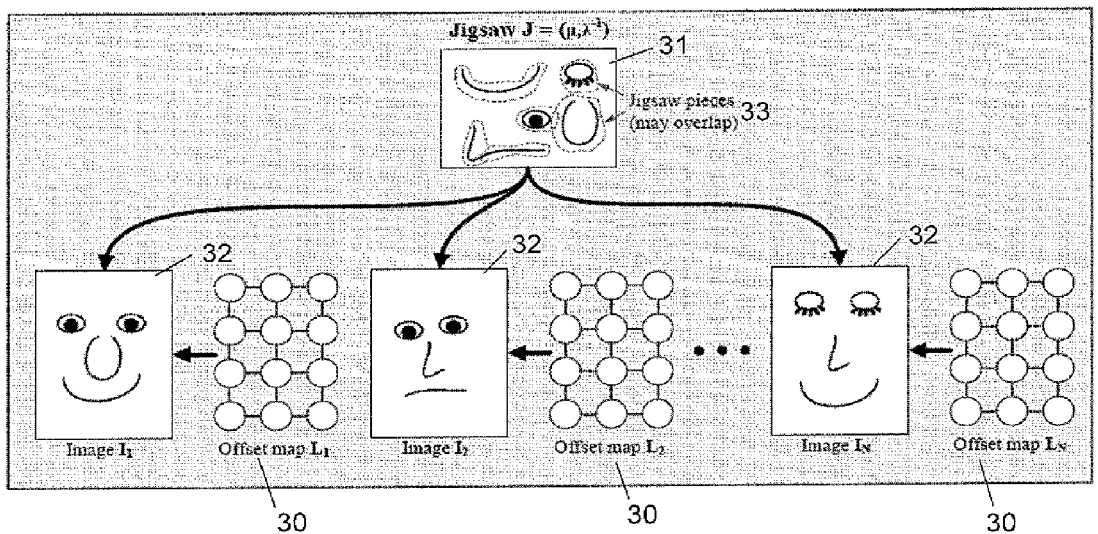
FIG. 3 is a schematic diagram of three input images, their corresponding offset maps and an associated output image comprising learnt repeated-structure elements, also referred to herein as a output image comprising learnt repeated-structure elements.

FIG. 3 illustrates the process of specifying the offset maps 30 and output image 31 (referred to as an output image comprising learnt repeated-structure elements j). In this example, there are three known input images 32 which are different from one another and here are shown as images of faces. Each input image 32 has an associated offset map 30 which defines the output image comprising learnt repeated-structure elements used to generate that image. The output image 31 comprises learnt repeated-structure elements 33 which may overlap.

Figure 4:
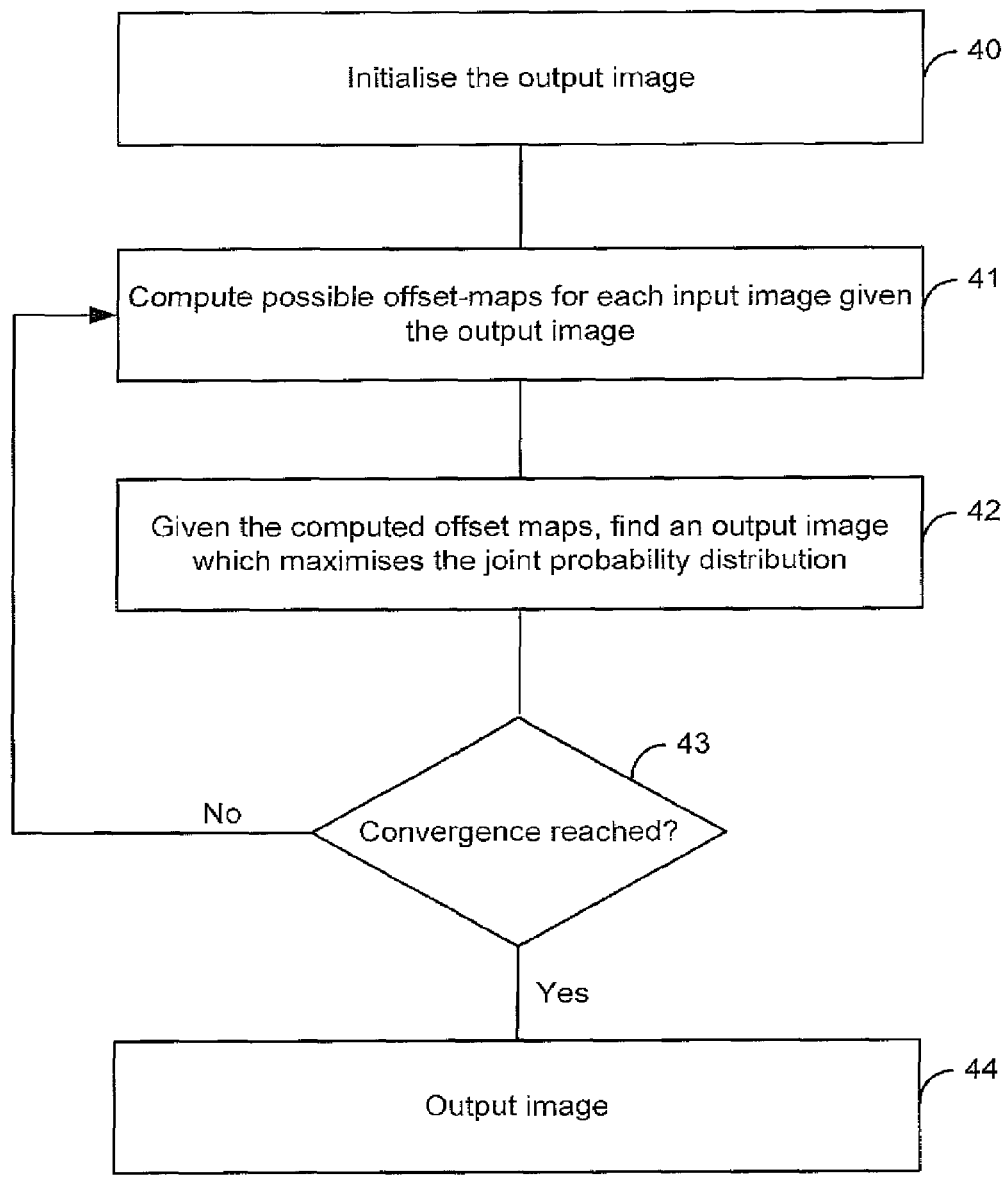
FIG. 4 is a flow diagram of an iterative learning process for use in the method of FIG. 2 in one example.

FIG. 4 is a flow diagram of an iterative process for finding an output image and offset maps. The output image is initialized in any suitable way 40 and possible offset maps are computed for each input image given the output image (box 41). For example, this is done by applying an alpha-expansion graph-cut algorithm as described in Y Boyokov et al "Fast approximate energy minimization via graph cuts" 1AMI, 23(1), 2001. However, any other suitable inference algorithm can be used such as belief propagation.

Given the computed offset maps, an output image is found which maximizes the joint probability distribution (box 42). This is done using any suitable analytical process as known in the art. Given the output image just found, the method is repeated so that new offset maps are computed for each input image given the output image just found (box 41). The output image is then recomputed (box 42) and this process iterated until convergence is reached (box 43). The output image 44 is then obtained.

FIGS. 5a to 5c show an example in which only one input image is used. FIG. 5a show the input image and FIG. 5b shows that input image with lines drawn on the edge of neighboring pixels that have different offsets. FIG. 5c shows the output image comprising the learned repeated-structure elements.

The input image is composed by placing three distinct objects, star, filled square and circle, at random positions on a black background image, with the pixels from the more recently placed object replacing the previously laid pixels. Hence, we can see substantial amount of occlusion of parts of these objects. Using this image as the only input, we would like our system to automatically infer the appearances and shapes of the objects present in the image.

While any existing clustering algorithm based on pixel colors can plausibly segment this image sufficiently well, these methods can not be used to learn the objects' shapes. Existing patch-based models are also not well-suited because of two reasons—firstly, there is no clear way to choose the appropriate patch shapes and sizes, and secondly, even if such a choice is known, it is difficult for these existing methods to learn the shape as they can not allow for occlusion boundaries without having an explicit shape model. For instance, in the epitome model mentioned above, a separate shape epitome is learned in conjunction with the appearance epitome so that image patches can be explained as a two-layered composition of appearance patches using the shape patch. However, this type of image is difficult to model with a small number of layers due to the large number of objects present. Our system, without any explicit modeling of layers or depth, can infer any number of layers. This is because our learning algorithm has the freedom to appropriately adjust its patch shape and size to explain only a portion of an object without explicitly having to represent a global layer ordering.

To illustrate this further, consider FIG. 5b. Here we have shown how the image decomposes into learnt repeated-structure elements. When two neighboring pixels have different learnt repeated structure element labels, they map to non-neighboring locations in the output image. With this understanding, we can look at the change in the labels of the adjacent pixels, and plot such a change as a line. Hence, each region bounded by the lines indicates a region from the input image being mapped to the output image comprising learnt repeated-structure elements. From FIG. 5b, we can see that the system has discovered well-defined parts (in this example, objects) present in the image. Each of the squares, circles and stars of FIG. 5a is bounded by a line and background regions between the shapes are also divided into irregularly shaped and sized pieces. This is further illustrated in our learned output image comprising learnt repeated-structure elements in FIG. 5c. The learned output image comprising learnt repeated-structure elements has captured the shapes and appearances of the three objects 50, 51, 52 and a small black region 53 for modeling the background. Pixels 54 in the output image comprising learnt repeated-structure elements that have never been used in explaining the observation are also shown. As the background does not have a consistent shape, the optimal solution favors using a very small region 53 in the output image comprising learnt repeated-structure elements to explain the background.

It is also possible to use a plurality of input images. For example, hundreds or thousands or even higher numbers of input images.

It can be seen that, the learnt repeated-structure elements are adapted during the learning process so that they tend to end up taking the shape of object parts in the input images. Not only are the appearances of different parts separated out using the learnt repeated structure elements, but the shape of those parts is now also found. This shape and appearance information may be used for object recognition and other tasks as described in more detail below. In addition, the method is able to deal with partial occlusion of objects in the input images. This is because the learnt repeated-structure elements are learned to be as large as possible whilst still being repeated as much as possible in the input image(s). Provided that an example of the occluded object also exists in the input images in which that object is not occluded or a different part of the object is occluded, appropriate learnt repeated-structure elements will be learnt for that object. If those learnt repeated structure elements are then used to segment the input images, the occluding boundary will also be a segment boundary.

The learning system can be said to comprise a generative process for generating a mapping from the input images to the learnt output image comprising the learnt repeated-structure elements.

More detail about the learning system is now given.

We define an output image comprising learnt repeated-structure elements j to be an image such that each pixel z has an intensity value $\mu(z)$ and an associated variance $\lambda^{-1}(z)$ (so $\lambda$ is the inverse variance, also called the precision). Alternatively, any other appearance model can be associated with each pixel of the output image comprising learnt repeated-structure elements, such as a histogram over intensity values or other image features. The output image comprising learnt repeated-structure elements is assumed to contain a number of pieces, possibly overlapping, that can be combined to generate images.

By allowing the output image comprising learnt repeated-structure elements to have arbitrary shape, we provide the ability to capture both the appearance and the shape of repeated image structures, for example, eyes, noses and mouths in a set of face images.

Our probabilistic model is a generative image model which generates an image by joining together pieces of the output image comprising learnt repeated-structure elements and then adding Gaussian noise of variance given by the output image comprising learnt repeated-structure elements. For each image I, we have an associated offset map L of the same size which determines the output image comprising learnt repeated-structure elements used to make that image. This offset map defines a position in the output image comprising learnt repeated-structure elements for each pixel in the image (more than one image pixel can map to the same repeated-structure element pixel). Each entry in the offset map is a two-dimensional offset $l=(l_x,l_y)$, which maps a 2D point in the image x to a 2D point in the output image z using $$z=(x-1) \bmod |J| \qquad (1)$$

where $|J|$=(width, height) are the dimensions of the output image comprising learnt repeated-structure elements. Notice that if two adjacent pixels in the image have the same offset label, then they map to adjacent pixels in the output image comprising learnt repeated-structure elements.

Given this mapping and the output image comprising learnt repeated-structure elements, the probability distribution of an image is assumed to be independent for each pixel and is given by $$P(I \mid J, L) = \prod_x N(I(x); \mu(x-1), \lambda(x-1)^{-1}) \qquad (2)$$

where the product is over image pixel positions and both subtractions are modulo $|J|$.

We want the images to consist of coherent pieces of the output image comprising learnt repeated-structure elements, and so, in one example, we define a Markov random field on the offset map to encourage neighboring pixels to have the same offsets.

$$P(L) = \frac{1}{Z} \exp\left[\sum_{(i,j) \in E} \psi(1_i, 1_j)\right] \qquad (3)$$

where E is the set of edges in a 4-connected grid. The interaction potential $\psi$ defines a Pott's model on the offsets:

$$\psi(1_i,1_j)=-\gamma\delta(1_i=1_j) \qquad (4)$$

where $\gamma$ is a parameter which influences the typical size of the learned output image comprising learnt repeated-structure elements. Currently, $\gamma$ is set to give the largest pieces whilst maintaining reasonable quality when the image is reconstructed from the output image comprising learnt repeated-structure elements.

When learning the output image comprising learnt repeated-structure elements, it is possible for regions of the output image comprising learnt repeated-structure elements to be unused, that is, to have no image pixels mapped to them. To allow for this case, we define a Normal-Gamma prior on $\mu$ and $\lambda$, for each output image comprising learnt repeated-structure elements pixel z, $$P(J) = \prod_z N(\mu(x); \mu_0, (\beta\lambda(z))^{-1}) \text{Gamma}(\lambda(z); a, b) \qquad (5)$$

This prior means that the behavior of the model is well defined for unused regions. In practice, we fix the hyperparameters $\mu$ to 0.5, $\beta$ to 1, b to three times the inverse data variance and a to the square of b. The local interaction strength $\gamma$ is set to 5. However, these values are approximate; any other suitable parameter values may be used.

We specify the joint probability distribution on a output image comprising learnt repeated-structure elements J, a set of images $I_1 \ldots I_N$, and their offset maps $L_1 \ldots L_N$ to be $$P(J, \{I, L\}_1^N) = P(J) \prod_{i=1}^{N} P(I_n \mid J, L_n) P(L) \qquad (6)$$

When learning a output image comprising learnt repeated-structure elements, the image set $I_1 \ldots I_N$ is known and we aim to achieve MAP learning of the remaining variables. In other words, we aim to find the output image comprising learnt repeated-structure elements J and offset maps $L_1 \ldots L_N$ that maximizes the joint probability (6).

We achieve this in an iterative manner. First, the output image comprising learnt repeated-structure elements is initialized by setting the precisions $\lambda$ to b/a, which is the expected value under the prior, and the means $\mu$ to Gaussian noise with the same mean and variance as the data. Given this initialization, the offset maps are updated for each image by applying the alpha-expansion graph-cut algorithm mentioned above (note that our energy is regular). Whilst this process will not necessarily find the most probable offset map, it is guaranteed to find at least a strong local minimum such that no single expansion move can increase (6).

Given the inferred offset maps, the output image comprising learnt repeated-structure elements J that maximizes P(J, $\{I,L\}_1^N$) can be found analytically. This is achieved for a output image comprising learnt repeated-structure elements pixel z, the optimal mean $\mu^*$ and precision $\lambda^*$ by using $$\mu^* = \frac{\beta\mu_0 + \sum_{x \in X} I(x)}{\beta + |X(z)|} \quad (7)$$

$$\lambda^{-1*} = \frac{b + \beta\mu_0^2 - (\beta + |X(z)|)(\mu^*)^2 + \sum_{x \in X(z)} I(x)^2}{a + |X(z)|} \quad (8)$$

where $X(z)$ is the set of image pixels that are mapped to the output image comprising learnt repeated-structure elements pixel z across all images.

When inference has converged, we apply a clustering step to determine the output image comprising learnt repeated-structure elements. Alternatively, the clustering arises directly during learning as mentioned above. Regions of the image are placed in clusters according to the degree of overlap they have in the output image comprising learnt repeated-structure elements. One metric which can be used is the ratio of the intersection to the union of the two regions of the output image comprising learnt repeated-structure elements the image regions map to, although other clustering metrics are also possible. This has the effect of clustering image regions by both appearance and shape. Each cluster then corresponds to a region of the output image comprising learnt repeated-structure elements with an (approximately) consistent shape that explains a large number of image regions.

The methods described herein may be used in the fields of image and/or video compression. For example, once the offset maps and output image are computed it is possible to reconstruct the input image(s) as described above. Thus, an image or a sequence of images may be compressed by computing the associated offset maps and output image. For example, consider using 100 input images each of size 64×64 pixels. If the output image size is set to say 128×128 pixels it has only ⅕₂₅ of the area of the input images combined. The offset maps can be stored as a description of the segmentation boundaries and a 2D offset value for each image segment rather than requiring color intensity value for each pixel. By identifying repeated-structure elements we are able to represent these only once in the output image thus enabling image compression.

In the case of video compression, the difference between the offset maps for frames in the video sequence is a flow image. In this case, two separate output images comprising learnt repeated-structure elements may be computed. One for the appearance information in the video and one for the flow information. The output image comprising learnt repeated-structure elements for the appearance information is obtained as described above using frames of the video as input images. The output image comprising learnt repeated-structure elements for the flow information is obtained in a similar manner but where each pixel of the output image defines a distribution over flow vectors rather than over colors. The output image comprising learnt repeated-structure elements for the flow information may be used to carry out motion segmentation and may also be used for tracking moving objects in a scene. Consider the example of a video of one person walking in front of another so that one partially occludes the other. The people are wearing the same colored clothing. Using the appearance information the system learns an output image comprising learnt repeated-structure elements describing legs for example. Using this information, the legs of the different people cannot be differentiated. However, using both appearance and flow information the system learns repeated-structure elements describing each person's legs separately.

The system of FIG. 1 can then also be thought of as an image and/or video compression system and the method of FIG. 2 is also a method of image and/or video compression.

Figure 6:
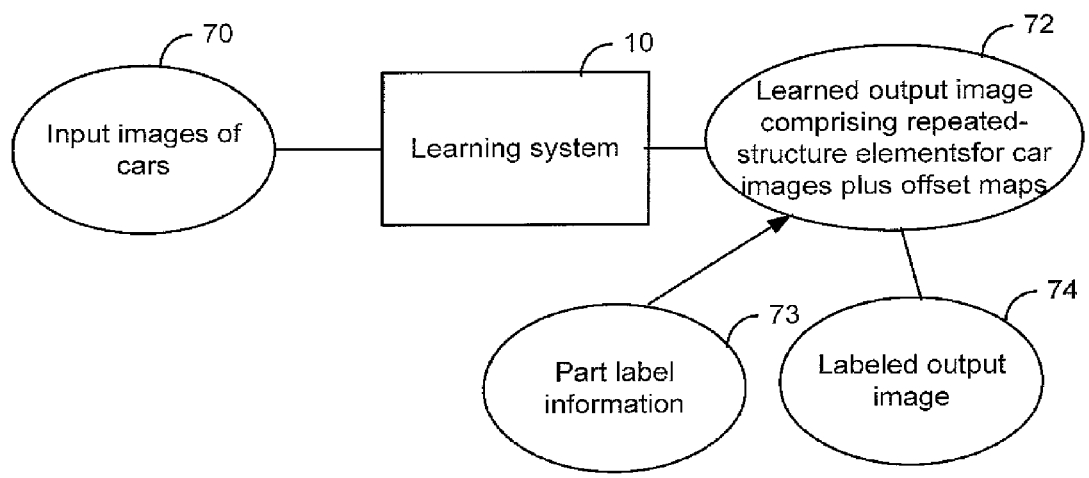
FIG. 6 is a schematic diagram of the learning system of FIG. 1 used for image synthesis.
Figure 7:
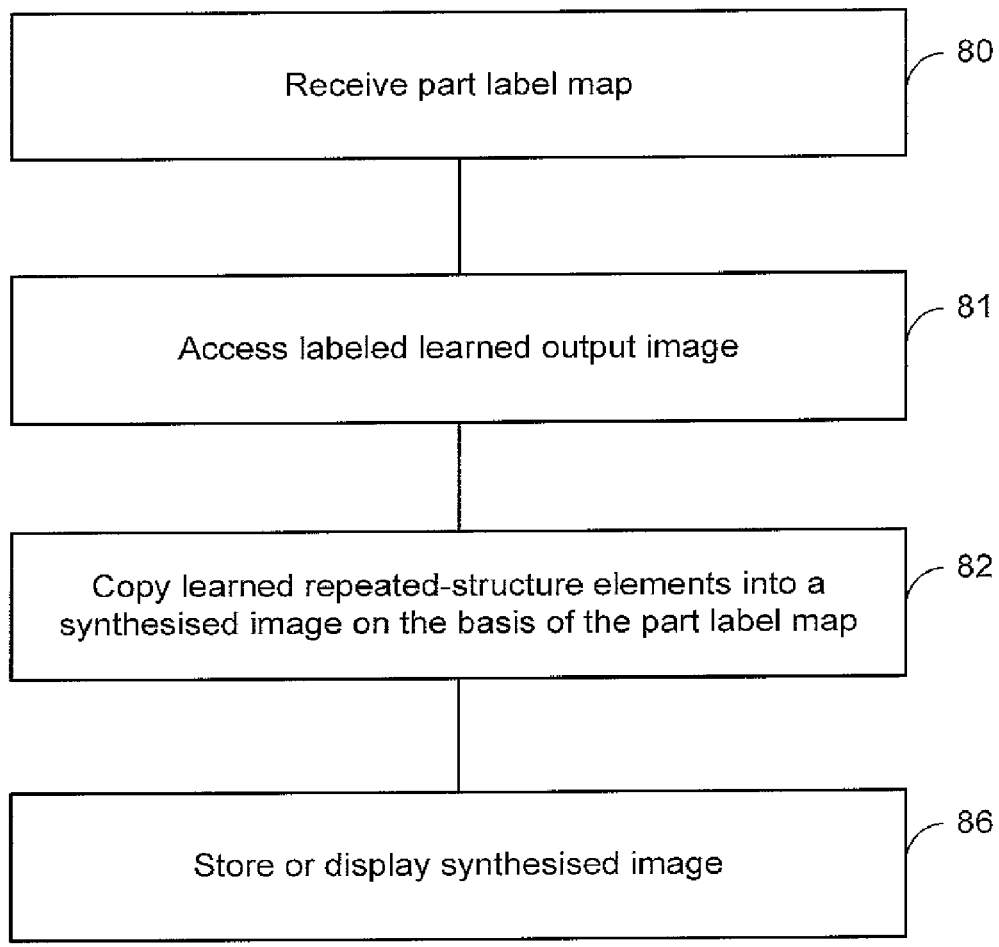
FIG. 7 is a flow diagram of a method of image synthesis.

The methods described herein are also suitable for use in image synthesis and image in-painting systems as now described with reference to FIG. 6. FIG. 6 shows the learning system of FIG. 1 used for learning a output image comprising learnt repeated-structure elements from a plurality of cars 70. The learning system 71 produces an output image comprising learnt repeated-structure elements 72 for the car images 70 together with an offset map for each input image. Part label information 73 is obtained that enables the learnt repeated-structure elements to be labeled (such as wheel, door, windscreen etc.), for example, by manual input. Suppose that it is required to synthesis a new image of a car given only a part label map for the image to be synthesized. A part label map is an image where each pixel position comprises a label indicating which image part is to be used at that position. Referring to FIG. 7 the part label map is received 80 and the labeled output image comprising learnt repeated-structure elements 74 accessed 81. Repeated-structure elements from output image 72 are then copied into the synthesized image on the basis of the part label map received (box 82). The synthesized image may then be stored or displayed 83. The process comprises finding, for each received part label in the part label map, a best corresponding learnt repeated-structure element. For this matching any suitable process can be used. In one example, we modify the distribution over the offset labels given by 3 to depend on the output image comprising learnt repeated-structure elements so that:

$$P(L \mid J) = \qquad (9)$$

$$\frac{1}{Z} \exp\left[\sum_{(i,j) \in E} \psi(1_i, 1_j) + \sum_{(i,j) \in E} \psi_{part}(1_i, 1_j) + \psi_{appearance}(1_i, 1_j)\right]$$

Where $\psi_{part}(1_i, 1_j)$ is a Pott's model that enforces that part labels of the neighboring pixels in the output image comprising learnt repeated-structure elements is consistent with the part labels of the neighbors in the observation. $\psi_{appearance}$ enforces that the appearances of the neighbors in the output image comprising learnt repeated-structure elements agree by penalizing based on squared intensities.

Images of other objects besides cars can also be synthesized by varying the input images and part label map accordingly. Also, the method may be modified to fill in unobserved or masked regions of an image. This process is known as in-painting. Pixels from an output image comprising learnt repeated-structure elements are copied to the unobserved pixels using inferred objects.

Figure 8:
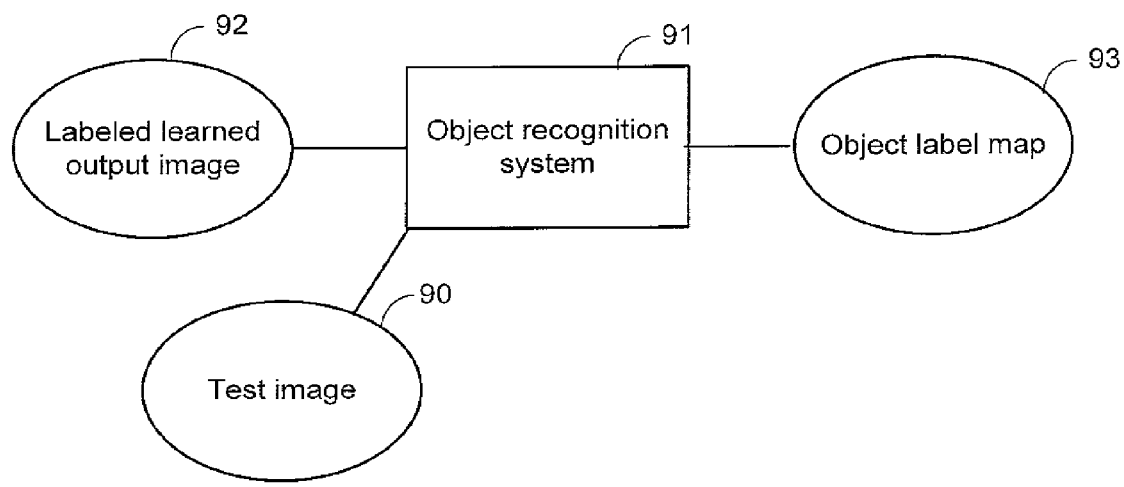
FIG. 8 is a schematic diagram of an object recognition system.
Figure 9:
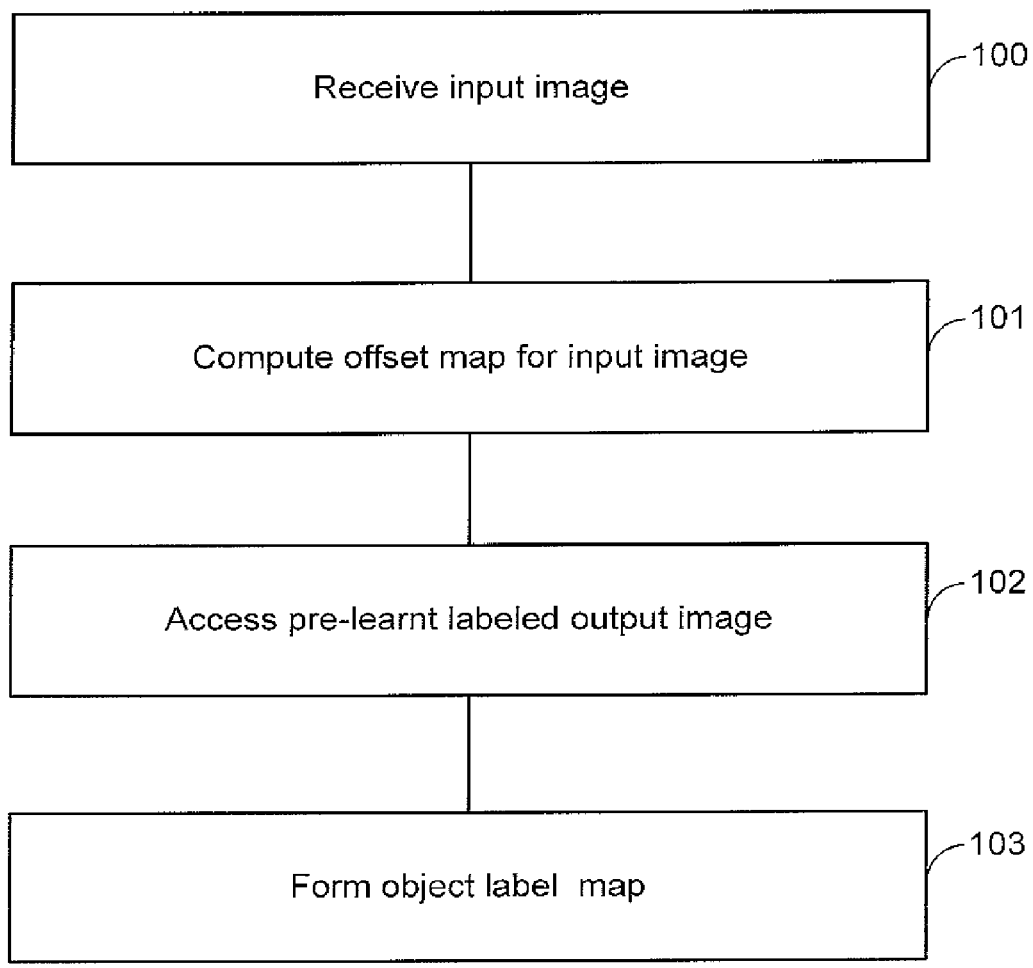
FIG. 9 is a flow diagram of a method of object recognition.

The methods described herein for leaning repeated-structure elements are also suitable for use in object detection, object recognition and object segmentation tasks. For example, with reference to FIGS. 8 and 9, suppose that an output image comprising learnt repeated-structure elements 92 is obtained from a plurality of input images of different classes of objects. That output image comprising learnt repeated-structure elements is then labeled either manually or using an independent source of information about object classes corresponding to the various learnt repeated-structure elements. A previously unseen image 90 is received 100 by an object recognition system 91 which accesses the pre-learnt labeled output image comprising learnt repeated-structure elements 92. The object recognition system 91 computes 101 an offset map for the input image 90 as described above and uses that offset map to form 103 an object label map 93 using 102 the labeled output image 92. The object label map comprises, for each pixel of the input image 90, a label indicating an object class which in this case is given by one of the repeated-structure elements.

The tasks of object detection and image segmentation are also achieved as a result of finding the offset maps. The offset maps effectively specify for a given input image, all pixels associated with a particular output image comprising learnt repeated structure elements. If a learnt repeated-structure element corresponds to an object or object part then object detection and segmentation are achieved.

In a particular example, the object recognition system is arranged to detect faces. Faces may be detected using the system of FIG. 8 even for partially occluded faces and faces against different backgrounds. It is not necessary for training images to comprise cropped faces. We have found that when a plurality of images of faces are provided as input to the learning system of FIG. 1, the resulting learnt repeated-structure elements are typically strongly associated with particular face parts. In this way small and large face parts of widely different shapes and aspect ratios are identified. We have also found that, many learnt repeated-structure elements are conserved across images of different peoples' faces.

The problem of stereo matching involves finding corresponding image elements in a pair of stereo images. This is particularly difficult where image regions have little texture and where there is partial object occlusion. The learning system described herein can be used to assist in the stereo matching process as now described.

Figure 10:
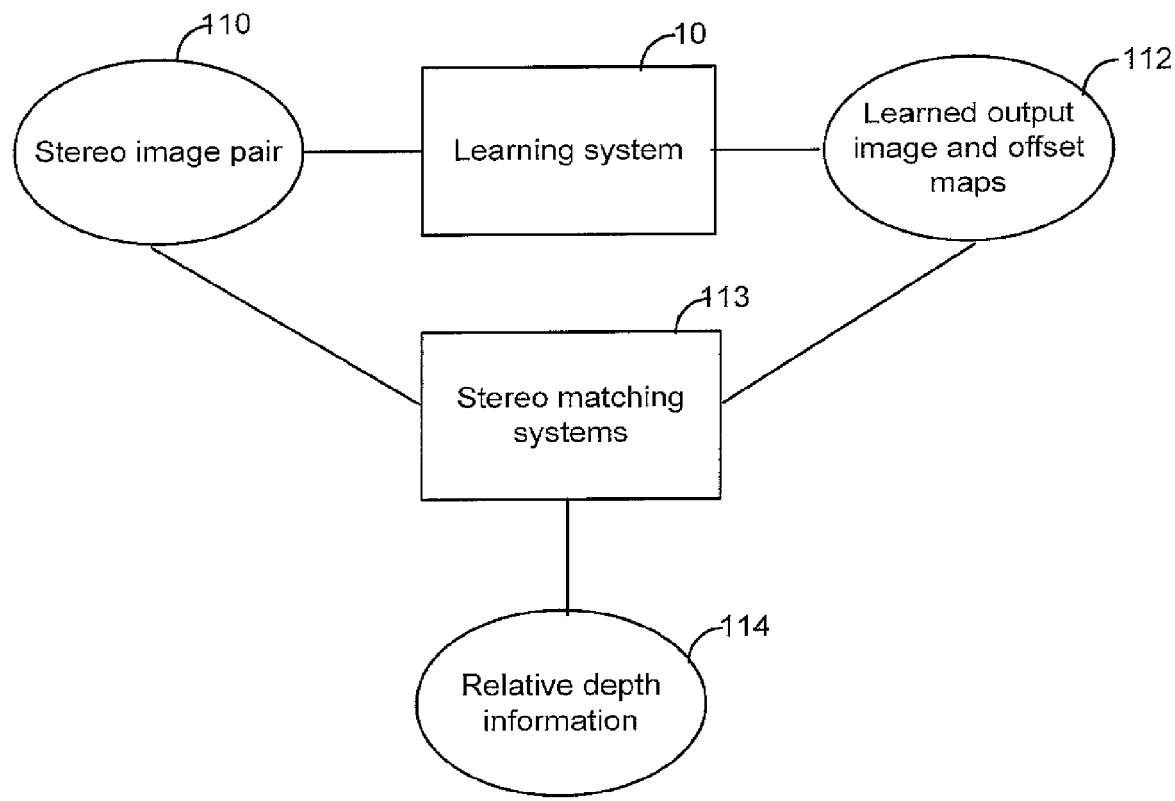
FIG. 10 is a schematic diagram of a stereo vision system.
Figure 11:
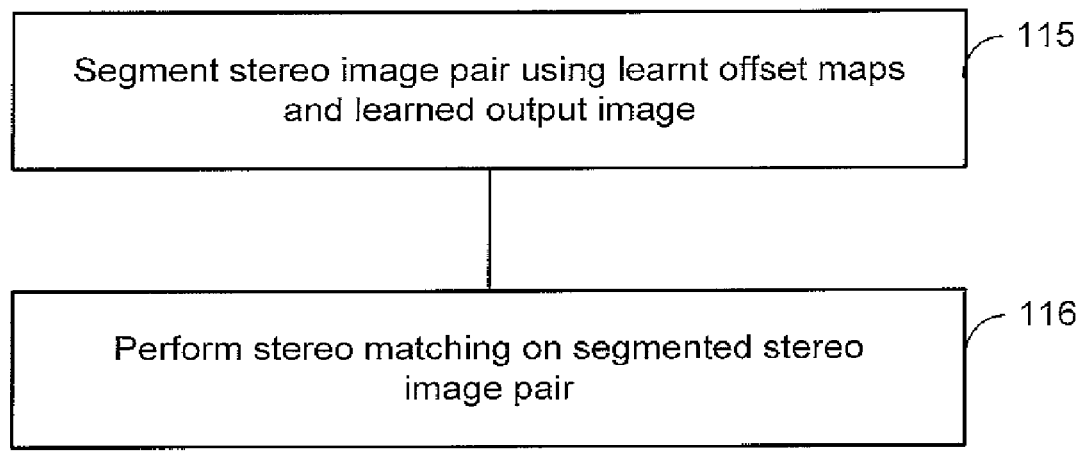
FIG. 11 is a flow diagram of a method of stereo matching.

FIG. 10 shows a stereo vision system comprising the learning system 10 of FIG. 1 and a stereo matching system 113. A stereo image pair is obtained in any suitable manner as known in the art. This stereo pair is provided to the learning system 10 which produces a output image comprising learnt repeated-structure elements and offset maps 112 as described above. The stereo matching system 113 takes as input the output image comprising learnt repeated-structure elements and offset maps 112 and the stereo image pair 110. It segments the stereo image pair using the output image comprising learnt repeated-structure elements and offset maps 112 (see box 115 of FIG. 11) and performs stereo matching on this segmented stereo image pair (box 116). Because corresponding segments can be easily identified in the two stereo images due to having similar mappings to the output image comprising learnt repeated-structure elements the stereo matching problem is reduced. The stereo matching system outputs relative depth information 114 which is stored or displayed as required.

As mentioned above, stereo image regions with little or no texture are difficult to stereo match; the present system addresses this problem by using larger repeated-structure elements. That is, because the joint probability distribution is arranged to tend to learn the largest possible repeated-structure elements that accurately represent regions of the input image(s) then these pieces are much more likely to contain sufficient texture or shape information to allow accurate matching. For example, if the background is the same in both images, it can be represented using a single learnt repeated-structure element. Stereo images comprising partially occluded objects are also difficult to stereo match. The amount of partial occlusion may be greater in one of the stereo images than the other. Once repeated-structure elements are known for the occluded object, it is possible to segment the stereo images. As described above, the segments will be cut at the occluding boundary so that stereo matching of the segments can proceed appropriately using any suitable known stereo matching algorithm.

Figure 12:
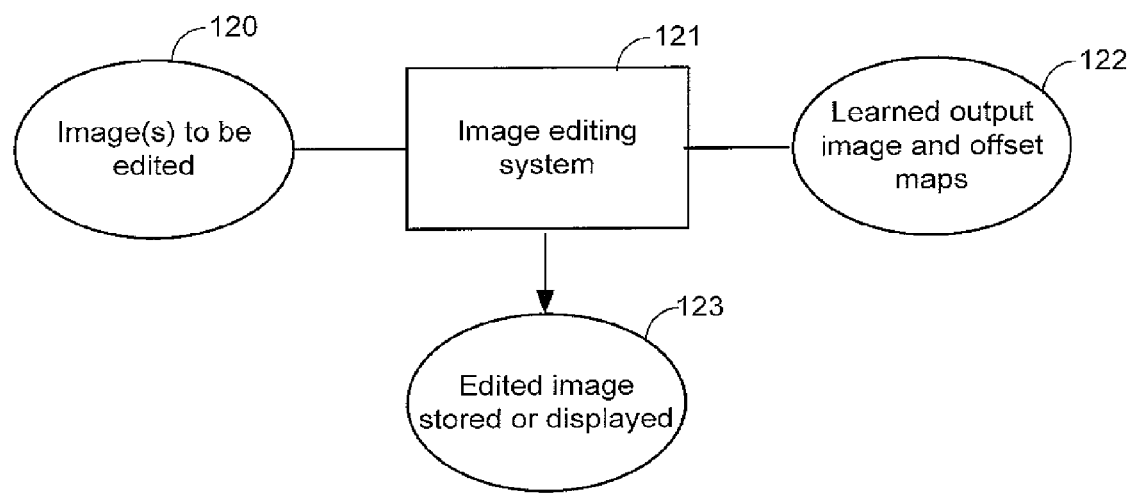
FIG. 12 is a schematic diagram of an image editing system.
Figure 13:
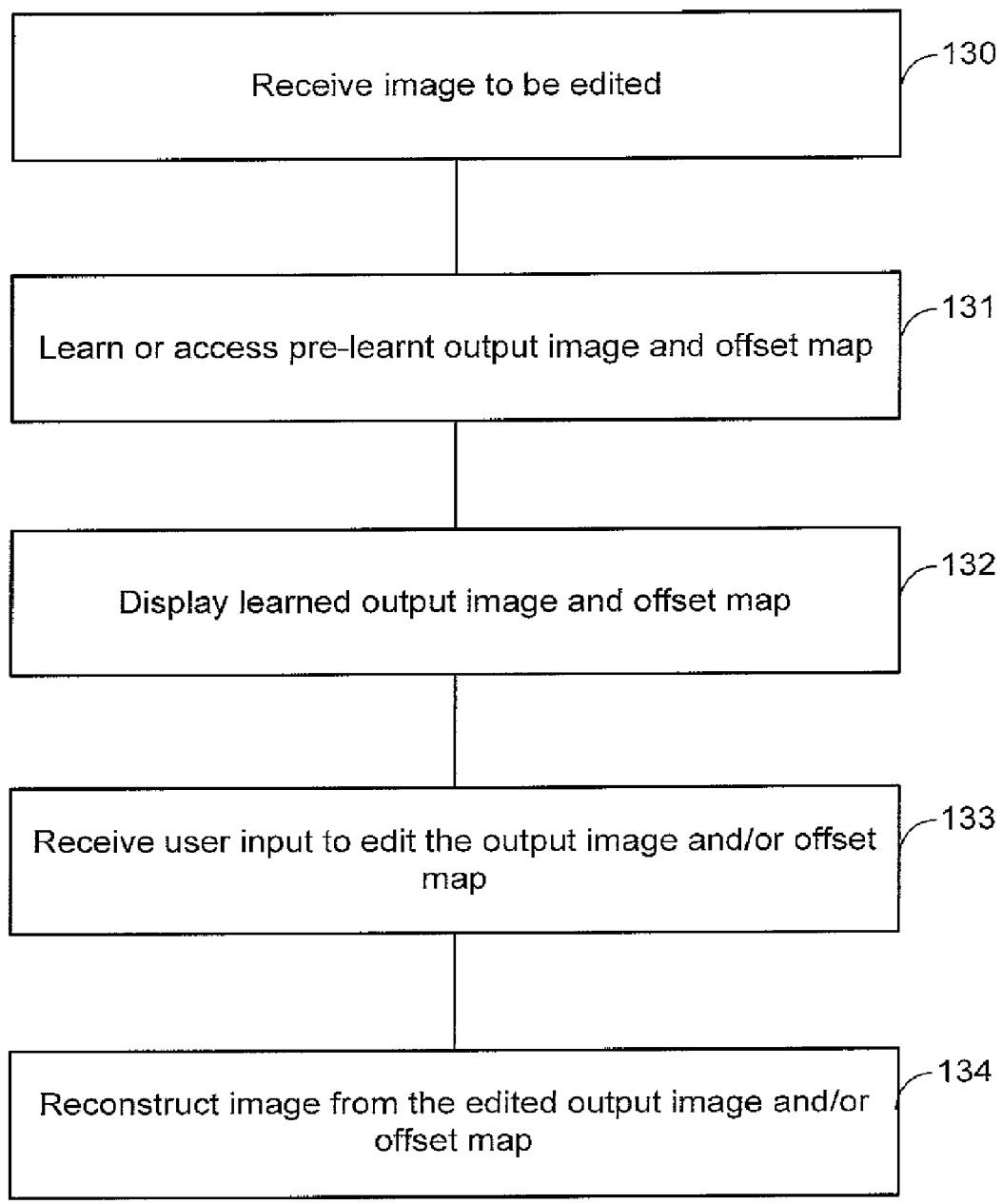
FIG. 13 is a flow diagram of a method of editing an image.

The learning system 10 of FIG. 1 can also be used in conjunction with an image editing system 121 as illustrated in FIG. 12. One or more images to be edited 120 are received 130 FIG. 13 by an image editing system 121 which also takes as input a output image comprising learnt repeated-structure elements and offset maps 122. The output image comprising learnt repeated-structure elements and offset maps are either determined by the image editing system 121 itself which may have a learning system 10 integral with it. Alternatively, the output image comprising learnt repeated-structure elements and/or the offset maps are determined in advance by an independent system 131 FIG. 13. For example, the output image comprising learnt repeated-structure elements may be learned in advance and the offset maps computed at the time of image editing. The output image comprising learnt repeated-structure elements and offset maps are displayed 132, for example, using a graphical user interface, and user input is received to edit the output image comprising learnt repeated-structure elements and/or offset map 133. An image is then reconstructed 134 from the edited output image comprising learnt repeated-structure elements and/or offset map and the edited image stored or displayed 123 FIG. 12. Alternatively, user-friendly tools can be provided which edit the output image comprising learnt repeated-structure elements or offset maps internally without exposing them to the user, to provide facilities like object removal, object/texture synthesis and so on.

Figure 14:
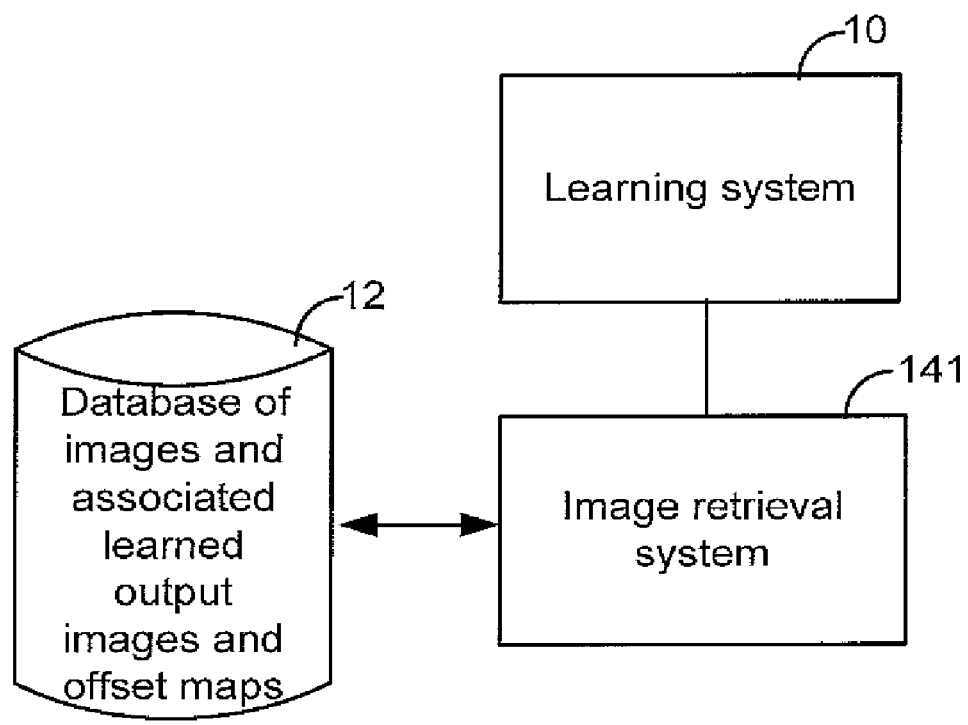
FIG. 14 is a schematic diagram of an image classification system and an image retrieval system.

The learning system 10 of FIG. 1 can also be used in conjunction with an image classification and/or retrieval system 141 as illustrated in FIG. 14. A database 140 of images and associated output image(s) comprising learnt repeated-structure elements is formed. The database optionally also stores offset maps associated with the images. For example, for each image there may be a unique output image comprising learnt repeated-structure elements and a unique offset map. Alternatively, groups of images may have a common output image comprising learnt repeated-structure elements but with unique offset maps for each image. An image may be a member of more than one group.

The image retrieval system 141 is arranged to retrieve images from the database on the basis of information about repeated-structure elements. For example, suppose that a task is to retrieve all images from the database 140 which comprise one or more output images comprising learnt repeated-structure elements in common with a test image. An output image comprising learnt repeated-structure elements is obtained for the test image using the learning system 10 of FIG. 1 and any suitable search algorithm is then used to identify images from the database 140 where the associated output image comprising learnt repeated-structure elements comprise the required repeated-structure elements.

Super resolution is the process of making a high resolution image from a low resolution one. We recognize that existing super resolution methods use only very local image information when creating the high resolution image and hence often fill in inappropriate details. An example of existing super resolution methods is given in William T. Freeman, Thouis R. Jones, and Egon C. Pasztor, "Example-based super-resolution", IEEE Computer Graphics and Applications, March/April, 2002.

Figure 15:
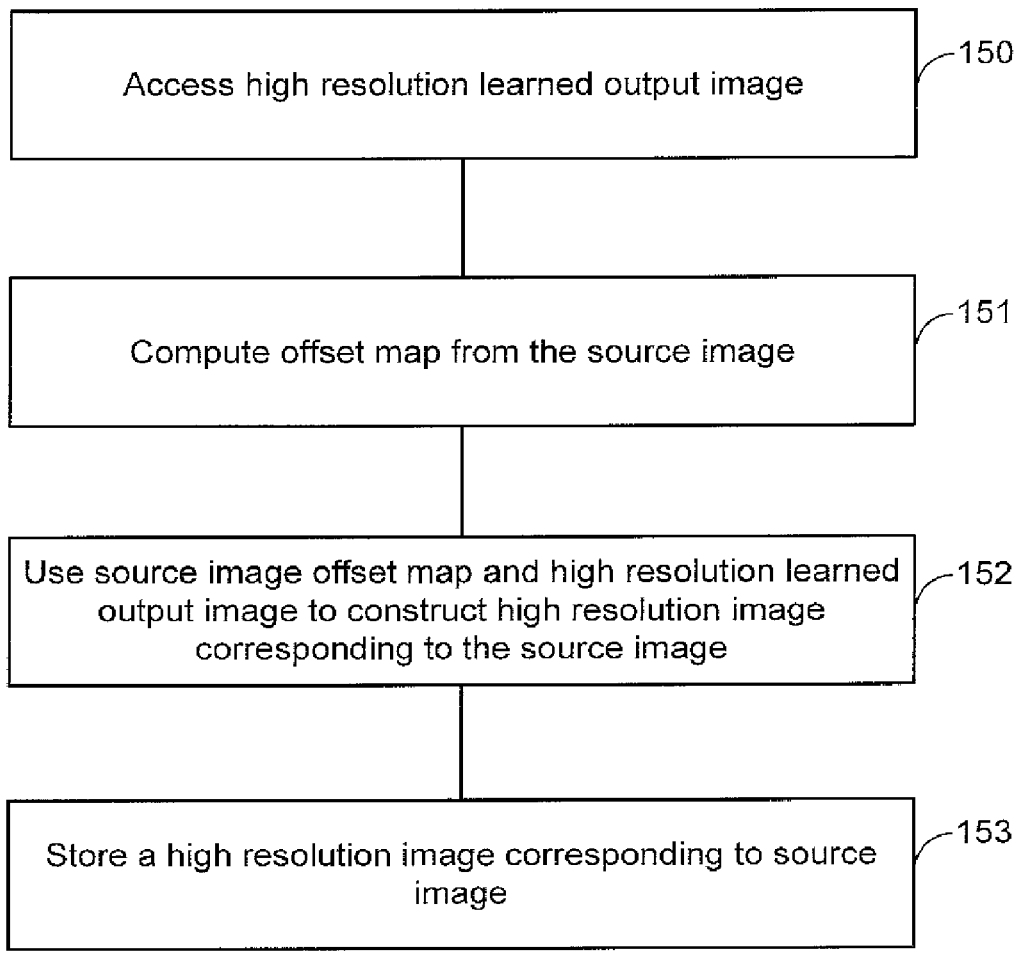
FIG. 15 is a flow diagram of a method of super-resolution.

FIG. 15 is a flow diagram of a method of using learnt repeated-structure element information to improve super resolution. The source image has lower resolution than an output image. A high-resolution output image comprising learnt repeated-structure elements is accessed 150. Taking the source image, an output image and offset map are computed 151 as described herein. This output image comprises lower resolution learnt repeated-structure elements. The offset map computed from the source image is then used 152 in conjunction with the high-resolution output image to reconstruct a high resolution image corresponding to the source image. The high resolution image is then stored 153 for example.

Textures may also be transferred between images on the basis of learnt repeated-structure elements. For example, suppose it is required to edit an image of a person in front of a busy street by replacing the busy street image regions by sky. Repeated-structure elements labeled as sky and obtained in advance can be used to replace the busy street image regions by modifying the offset map in a similar manner as described above.

In another example an apparatus comprises: an input arranged to receive one or more input images; specification means arranged, for each input image to specifying an initial offset map comprising a mapping of pixels from the input image onto an initialized output image; a processor arranged to specify a joint probability distribution on the output image, the input images and the offset maps; an optimizer arranged to optimize the joint probability distribution to find a learnt output image and offset maps, the learnt output image comprising learnt repeated structure elements having variable shape, size and appearance; and an output arranged to output the learnt output image and offset maps.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising: performed by one or more processors executing computer-readable instructions, receiving one or more input images;

for each input image, specifying an initial offset map comprising a mapping of image elements from the input image onto an initialized output image;

specifying a joint probability distribution on the output image, the input images and the offset maps such that the joint probability distribution comprises a neighborhood constraint such that the repeated-structure elements tend to be learned such that their size is as large as possible while still enabling the repeated-structure elements to describe as many regions in the input image(s) as possible;

optimizing the joint probability distribution to find a learned output image and offset maps, the learned output image comprising learned repeated-structure elements having variable shape, size and appearance; and outputting the learned output image and offset maps.

2. The computer-implemented method as claimed in claim 1 wherein the output image is smaller in area than the combined area of the input images.

3. The computer-implemented method as claimed in claim 1 wherein the joint probability distribution is specified such that each of the learned repeated-structure elements are substantially the same in appearance and shape to two or more regions of the input image(s).

4. The computer-implemented method as claimed in claim 1 which comprises relaxing the neighborhood constraint such that the learned repeated-structure elements are substantially invariant to local deformations, scaling and small rotation of regions in the input images.

5. The computer-implemented method as claimed in claim 1 wherein the joint probability distribution is further specified such that any of the input images may be approximately reconstructed using only pieces from the learned output image.

6. The computer-implemented method as claimed in claim 1 wherein the optimization further comprises clustering the output image on the basis of appearance and shape, the resulting clusters being the learned repeated-structure elements.

7. The computer-implemented method as claimed in claim 1 wherein the optimization-further comprises an expectation maximization process.

8. The computer-implemented method as claimed in claim 1 wherein the optimization is an iterative process comprising:

computing possible offset maps given the initialized output image; and given the computed offset maps, finding an output image which optimizes the joint probability distribution.

9. The computer-implemented method as claimed in claim 8 wherein computing the possible offset maps is carried out using any of: a graph-cut algorithm and belief propagation.

10. The computer-implemented method as claimed in claim 8 wherein optimizing the joint probability distribution is carried out using an analytical process.

11. The computer-implemented method as claimed in claim 1 which further comprises:
labeling the repeated-structure elements in the learned output image with information about object classes repeated-structure elements relate to;
receiving a test image of objects for which it is required to carry out object recognition;
determining an offset map for the test image given the labeled learned output image; and
labeling the test image using the determined offset map and labeled learned output image such that objects in the test image are recognized.

12. The computer-implemented method as claimed in claim 1 which further comprises:
during receiving of the input images, receiving a sequence of images of one or more objects moving in a scene; and wherein the method comprises obtaining two learned output images, one comprising appearance information and the other comprising flow information.

13. A computer-implemented method comprising:
performed by one or more processors executing computer-readable instructions, receiving one or more input images;
for each input image, specifying an initial offset map comprising a mapping of image elements from the input image onto an initialized output image;
specifying a probabilistic model of a relationship between the output image, the input images and the offset maps such that it comprises a neighborhood constraint such that the repeated-structure elements tend to be learned such that their size is as large as possible while still enabling the repeated-structure elements to describe as many regions as possible in the input image(s);
applying an unsupervised learning process to the probabilistic model to find a learned output image and offset maps, the learned output image comprising learned repeated-structure elements having variable shape, size and appearance; and
outputting the learned output image and offset maps.

14. The computer-implemented method as claimed in claim 13 which further comprises using the learned repeated-structure elements in any of: an object recognition system, an object detection system, an image segmentation system, an image synthesis system, an image in-painting system, a stereo vision system, an image editing system, an image classification system, an image retrieval system, a super-resolution system, an image texture-transfer system, a motion segmentation system, a motion tracking system and an image/video compression system.

15. The computer-implemented method as claimed in claim 13 wherein the probabilistic model is specified such that any of the input images may be approximately reconstructed using only pieces from the learned output image.

16. The computer-implemented method as claimed in claim 13 wherein the unsupervised learning step comprises clustering the output image on the basis of appearance and shape, the resulting clusters being the learned repeated-structure elements.

17. One or more device-readable storage media with device-executable instructions that, when executed on a processor, configure the processor to perform acts comprising:
receiving one or more input images;
for each input image, specifying an initial offset map comprising a mapping of image elements from the input image onto an initialized output image;
specifying a joint probability distribution on the output image, the input images and the offset maps such that the joint probability distribution comprises a neighborhood constraint such that the repeated-structure elements tend to be learned such that their size is as large as possible while still enabling the repeated-structure elements to describe as many regions in the input image(s) as possible;
optimizing the joint probability distribution to find a learned output image and offset maps, the learned output image comprising learned repeated-structure elements having variable shape, size and appearance; and
outputting the learned output image and offset maps.

18. The one or more device-readable media as claimed in claim 17 wherein the output image is specified such that it is smaller in area than the combined area of the input images.

* * * * *